(12) United States Patent
Catalano

(10) Patent No.: US 8,702,292 B2
(45) Date of Patent: Apr. 22, 2014

(54) LINEAR ILLUMINATION DEVICES HAVING LIGHT GUIDES AND LED-BASED ILLUMINATION MODULES

(75) Inventor: Anthony Catalano, Boulder, CO (US)

(73) Assignee: TerraLUX, Inc., Longmont, CO (US)

( * ) Notice: Subject to any disclaimer, the term of this patent is extended or adjusted under 35 U.S.C. 154(b) by 243 days.

(21) Appl. No.: 13/239,620

(22) Filed: Sep. 22, 2011

(65) Prior Publication Data

US 2012/0069595 A1 Mar. 22, 2012

Related U.S. Application Data

(60) Provisional application No. 61/385,378, filed on Sep. 22, 2010, provisional application No. 61/385,387, filed on Sep. 22, 2010.

(51) Int. Cl.
 *F21V 7/04* (2006.01)
 *H01L 33/00* (2010.01)

(52) U.S. Cl.
 USPC .......................... 362/555; 362/327

(58) Field of Classification Search
 None
 See application file for complete search history.

(56) References Cited

U.S. PATENT DOCUMENTS

| | | | |
|---|---|---|---|
| 5,363,294 A | 11/1994 | Yamamoto et al. | |
| 6,017,130 A | 1/2000 | Saito et al. | |
| 6,357,903 B1 | 3/2002 | Furusawa et al. | |
| 6,612,710 B2 | 9/2003 | Suzuki et al. | |
| 6,612,730 B1 | 9/2003 | Ikeda | |
| 6,637,905 B1* | 10/2003 | Ng et al. | 362/601 |
| 6,744,033 B2 | 6/2004 | Ikeda | |
| 6,783,254 B2 | 8/2004 | Fujino et al. | |
| 6,783,269 B2 | 8/2004 | Pashley et al. | |
| 6,910,783 B2 | 6/2005 | Mezei et al. | |
| 6,961,190 B1* | 11/2005 | Tamaoki et al. | 359/726 |
| 6,979,112 B2 | 12/2005 | Yu et al. | |
| 7,052,168 B2 | 5/2006 | Epstein et al. | |
| 7,221,416 B2 | 5/2007 | Hahm et al. | |
| 7,223,010 B2 | 5/2007 | Min et al. | |
| 7,287,896 B2 | 10/2007 | Okamoto et al. | |
| 7,308,187 B2 | 12/2007 | Saito et al. | |
| 7,478,941 B2 | 1/2009 | Wu et al. | |
| 7,513,666 B2 | 4/2009 | Ishikura et al. | |
| 7,517,131 B2 | 4/2009 | Hsieh | |
| 7,549,782 B2 | 6/2009 | Ng et al. | |
| 7,614,772 B2 | 11/2009 | Tamaki et al. | |
| 7,802,899 B2 | 9/2010 | Ikeda | |
| 2002/0034070 A1 | 3/2002 | Kumagai | |
| 2003/0026106 A1* | 2/2003 | Knaack et al. | 362/511 |
| 2003/0206408 A1* | 11/2003 | Funamoto et al. | 362/31 |
| 2003/0219207 A1* | 11/2003 | Guy | 385/49 |
| 2004/0066659 A1* | 4/2004 | Mezei et al. | 362/555 |
| 2004/0070989 A1* | 4/2004 | Amano et al. | 362/520 |
| 2004/0095743 A1* | 5/2004 | Yu et al. | 362/31 |
| 2004/0120019 A1* | 6/2004 | Chou | 359/1 |
| 2004/0136077 A1 | 7/2004 | Leu et al. | |

(Continued)

FOREIGN PATENT DOCUMENTS

| | | |
|---|---|---|
| DE | 1959740 | 6/1971 |
| EP | 0800036 | 10/1997 |

(Continued)

*Primary Examiner* — Britt D Hanley
(74) *Attorney, Agent, or Firm* — Bingham McCutchen LLP

(57) ABSTRACT

In various embodiments, LED-based illumination devices include an inlet region for receiving the LED light that is complementary in shape to the lens of the LED.

32 Claims, 7 Drawing Sheets

(56) References Cited

U.S. PATENT DOCUMENTS

| | | | |
|---|---|---|---|
| 2004/0141336 A1* | 7/2004 | West et al. | 362/555 |
| 2004/0264188 A1* | 12/2004 | Tazawa et al. | 362/257 |
| 2005/0210643 A1* | 9/2005 | Mezei et al. | 29/25 |
| 2006/0002108 A1* | 1/2006 | Ouderkirk et al. | 362/231 |
| 2006/0215417 A1* | 9/2006 | Chen | 362/555 |
| 2007/0086205 A1* | 4/2007 | Krupa et al. | 362/554 |
| 2007/0217189 A1 | 9/2007 | Graham | |
| 2007/0263405 A1* | 11/2007 | Ng et al. | 362/555 |
| 2009/0034288 A1 | 2/2009 | Ho et al. | |
| 2009/0310190 A1 | 12/2009 | Ikeda | |
| 2010/0002461 A1 | 1/2010 | Wu et al. | |
| 2010/0103681 A1 | 4/2010 | Kamei et al. | |
| 2010/0214507 A1 | 8/2010 | Noh et al. | |
| 2010/0214764 A1* | 8/2010 | Chaves et al. | 362/84 |
| 2012/0163013 A1* | 6/2012 | Buelow et al. | 362/555 |

FOREIGN PATENT DOCUMENTS

| | | |
|---|---|---|
| EP | 1746457 | 1/2007 |
| GB | 2429514 | 2/2007 |
| JP | 11084135 | 3/1999 |
| JP | 2002101271 | 4/2002 |
| JP | 2002243946 | 8/2002 |
| JP | 3334833 | 10/2002 |
| JP | 2003123501 | 4/2003 |
| JP | 2008140726 | 6/2008 |
| JP | 2009016246 | 1/2009 |
| JP | 2009259557 | 11/2009 |
| JP | 2010129282 | 6/2010 |
| KR | 20040092073 | 11/2004 |
| KR | 20080053443 | 6/2008 |
| WO | WO-2009084052 | 7/2009 |

* cited by examiner

LINEAR ILLUMINATION DEVICES HAVING LIGHT GUIDES AND LED-BASED ILLUMINATION MODULES

RELATED APPLICATIONS

This application claims the benefit of and priority to U.S. Provisional Patent Application No. 61/385,378, filed Sep. 22, 2010, and U.S. Provisional Patent Application No. 61/385,387, filed Sep. 22, 2010, the entire disclosure of each of which is hereby incorporated herein by reference.

FIELD OF THE INVENTION

In various embodiments, the present invention relates to illumination devices, in particular illumination devices incorporating light-emitting diodes.

BACKGROUND

Commonly used fluorescent lights are typically long, linear, hollow glass tubes filled with reduced-pressure gases that, when excited by a suitable electrical current, cause a glow discharge (i.e., a plasma). This glow discharge produces short-wavelength light, which in turn causes fluorescence of a coating (typically lining the inside surface) within the tube. The light produced, generally white for ordinary purposes, is emitted from the coating in all directions as a diffuse glow. Because it is emitted in all directions, fluorescent light is difficult to focus to a desired spot, requires a reflector or other optical element that causes substantial losses of useful light, and requires support electronics (often referred to as a ballast) which add cost and reduce the overall efficiency. Nonetheless, fluorescent lights are ubiquitous due to their high electrical-to-optical efficiency.

Plasmas exhibit a peculiar property known as "negative resistance," i.e., plasmas do not obey Ohm's Law—they do not exhibit a linear and positive current-voltage relationship. Instead, when an increasing voltage is applied to a fluorescent light, very little current flows until a breakdown of the gas occurs, reducing the apparent resistance, after which current and voltage increase, but usually in a non-linear fashion. The ballast, either magnetic or electronic, causes a high voltage to be initially applied to form the plasma, but thereafter limits the current to a suitable value. However, these electronics add bulk and cost, reduce efficiency, and increase the probability of failure.

Light-emitting diode (LED) technology offers a variety of advantages when compared to fluorescent and incandescent lights, including increased efficiency. When compared to fluorescent lights, LEDs differ markedly in their requirements. They require low, preferably DC voltages, typically operate at low temperature, ordinarily below about 100° C., and generally utilize a constant current for efficient operation. However, unlike fluorescent lights, LEDs are near point sources of light. There are ways to diffuse light from an array of LEDs, such as the utilization of holographic diffusers, but these may not be optimal for all applications.

Fluorescent lights typically have an energy efficiency of 50-100 lumens per watt, although the ballast and the optical efficiency of the fixture generally lower that considerably. LEDs are more efficient, e.g., in the range of 100-200 lumens per watt. And, the more directional nature of the LED light may be utilized to avoid optical inefficiencies. The use of LEDs may also obviate the need for a ballast, further improving the overall efficiency.

Linear illumination devices (i.e., those having one dimension much larger than another perpendicular dimension) incorporating LEDs typically utilize a linear arrangement (i.e., along the axial length of the device) of LEDs in individual packages including, e.g., electrical leads and focusing optics such as lenses. Each package may contain one or more individual semiconductor dies in a series, parallel, or series-parallel electrical circuit. These arrangements are capable of yielding a high lumen output but suffer from several disadvantages. First, the use of lensed LEDs causes the light source to emit a circular light beam unless the length of the LED array is considerably larger than the diameter of the beam at the desired working distance. For example, an LED with an angular distribution θ (theta) of 10°, projected from a ceiling height of 10 feet, yields a circular light with a diameter of 5.8 feet. Therefore, the length of the linear light source, and hence the length of the LED array itself, must be comparable to this diameter before the light pattern can be considered "linear."

Furthermore, the use of large numbers of individual LEDs, while useful insofar that the heat from each LED is spatially distributed, raises the cost of the overall product because one must pay for the packaging of each LED. In addition to imposing a significant cost burden, a typical linear light source based on LEDs appears to be composed of numerous extremely bright point sources, rather than a unitary source emitting light uniformly across its length, which is distracting and results in deleterious glare. While the LEDs may be covered with a diffusing screen to "blend" the light, this diminishes optical efficiency.

Moreover, as development of LEDs matures, the light output and energy efficiency of individual LEDs increases. Thus, over time, fewer individual LEDs will be required to produce a given level of illumination. While this trend may reduce overall cost, it also implies that a desired light output necessitates a linear array of fewer LEDs. For a given linear light source dimension, the LEDs will be spaced further apart, further confounding the shape of the resulting light pattern and exacerbating the above-described issues.

In order to address these problems, light guides have been developed to transform the light in a beneficial manner. In general, such light guides provide illuminating light from the long dimension of a clear solid or hollow rod while light enters the rod from the small dimension (i.e., the "end"). Unfortunately, the optical efficiency of such devices is very low −50% or more of the light generated by the external light source is lost (i.e., not emitted from the light guide), making such light guides undesirable as means of providing high efficiency, compact, linear lighting.

FIG. 1 depicts one origin of inefficiencies in such an optical assembly 100. Generally, an LED 110 faces the flat face 120 of the light guide 130. Light emerging from the LED 110 generally has a Lambertian (i.e., omnidirectional) distribution. An exemplary light ray 140, representing a portion of the light emitted near the plane of the LED (i.e., nearly parallel to face 120), does not impinge upon the flat face 120 and is lost. Light emitted toward the light guide 130 at a slightly greater angle, e.g., light ray 150, will be at least partially reflected at the flat face 120, although a portion of the ray 150 will typically enter the light guide 130. And, since such light enters the light guide 130 at an angle greater than that required for total internal reflection (TIR), this light will still emerge from the light guide 130. However, because this light will be cut off abruptly when the condition for TIR occurs (whether or not it is reflected from the back surface of the rod (i.e., a reflector 160), as shown in FIG. 1), the exiting light ray 170 will form an undesirable localized spot in the light emitted from light guide 130. (By way of example, the sharp cutoff for a plastic rod of refractive index of 1.49 in air occurs at 42°.) In contrast, the light ray 180 is internally reflected toward reflector 160. Additionally, light that is not reflected from the reflector 160, and which arrives at the far surface 190 of the light guide 130 at an angle greater than that required for total internal reflection will exit the light guide 130 (except for a small amount reflected back at the surface 190 (not shown)), further reducing the efficiency of the optical assembly 100.

Thus, there is a need for linear illumination devices based on LEDs that simulate the light pattern emitted by fluorescent lights while limiting light losses and localized spots in the emission pattern, and that satisfy the different operating requirements for LEDs while enabling them to function with high efficiency.

SUMMARY

In order to improve the optical efficiency of LED-based linear light sources substantially beyond 50% and provide a more linear output light beam, embodiments of the invention incorporate certain features. First, a lens (including or consisting essentially of, e.g., an inlet and a collimation region) is utilized to increase the optical coupling efficiency between one or more LEDs and a linear light guide. Preferably, the lens is a solid optic, in particular a TIR optic, formed as an integral part of the light guide, that shapes the entrance into the bulk of the light guide. In various embodiments, one or both ends of the light guide are shaped. As utilized herein, the term "linear" refers to light guides having one dimension significantly larger than another perpendicular dimension, but such light guides are not necessarily constrained to take the shape of a straight line. For example, linear light guides and/or illumination devices in accordance with embodiments of the invention may be formed into arbitrary shapes such as U-shapes, circles, and ovals, where the light guide is "linear" along the perimeter or length of the shape.

The shape of the lens may depend on several factors, including the number of LEDs to be coupled thereto. In various embodiments utilizing a single LED, the lens is shaped as a paraboloid having a focal point at the position of the LED. The lens is mated to (and may be an integral portion of) a linear light guide having a cross-section (e.g., a circular, trapezoidal, or parabolic cross-section) that is substantially constant over the remaining length of the light guide. Preferably, the interface (i.e., the change in cross-section) between the parabolic lens and the light-guide bulk is smooth and continuous.

For ease and economy of fabrication, as well as for increased light output, various embodiments feature multiple LEDs emitting light into a single end of the light guide. The above-described paraboloid lens may be utilized in such embodiments incorporating multiple LEDs. However, the lens may also be shaped as several paraboloids, one for each LED.

For LEDs (or other light sources that have a wide Lambertian light distribution), considerable light exits close to the plane of the semiconductor die of the LED. However, the shape of the parabolic lens may be such that the angle of incidence of some light is greater than the critical angle. In order to prevent the escape of such light (which would decrease optical efficiency), the lens may be coated with a material (e.g., a metal such as aluminum) whose refractive index is much higher than the light guide material. Alternatively or in combination, the shape of the lens entrance may be blunted to an angle below the critical angle. In preferred embodiments, the lens entrance is also a paraboloid whose shape maintains the angle of incidence below the critical angle. Thus, some embodiments of the invention feature a lens having a dual-paraboloid shape, one for the entrance of the TIR lens and another for the region coupled to the bulk of the light guide.

The lens also preferably directs incoming light from the LED(s) such that it reflects inside the light guide as little as possible (i.e., so as to minimize the number of internal reflections), as each reflection may represent a loss of efficiency. For example, light entering the light guide may reflect from the back of the light guide and exit from the front. Thus, in preferred embodiments, the lens is shaped to distribute the light from the LED(s) across the back reflector as evenly as possible. That is, the axis of the parabola (or parabolas) is preferably inclined at such an angle to distribute light uniformly along the length of the rear reflector. Furthermore, the rear reflector may be faceted to redirect that light directly out of the light guide (e.g., normal to the long axis). Alternately or in conjunction, a Lambertian scattering material of high efficiency may be employed as the rear reflector. Such a material distributes the light over a wide exit angle, thus enhancing uniformity and simplifying fabrication.

As described above, in various embodiments the rear reflector of the light guide redirects in-coming light out of the front face of the light guide, and the lens is designed to illuminate this rear reflector. The rear reflector may not be an idealized specular reflector but may rather be a Lambertian scattering reflector of high efficiency. The reflector may have facets (or other elements) angled to reflect the light substantially normal to the exit face of the light guide, taking into account the light distribution of the TIR entrance optic. The facets of the rear reflector may take the shape of a polygon or of a section of a spheroid, and/or the facets may be at least partially filled with a light-scattering material. Because the reflected light from the rear reflector is typically divergent, the shape of the walls of the light guide may be designed to reflect the divergent beam. Thus, the bulk of the waveguide may have a cross-section shaped as, e.g., a parabola, in order to redirect the emitted light. The height and width of both the front exit and rear reflector may be calculated to achieve a light distribution of the exit beam to meet desired output requirements. A tall, narrow, parabolic cross-section generally gives rise to a narrow beam, while a shallow cross-section typically yields a broader beam profile. In various embodiments, the TIR optic is suitably shaped to uniformly illuminate the back reflector interfaced to such shaped light guides.

In various embodiments, light from one or more LEDs is input to the light guide from one side only, and the opposite face of the light guide may prevent light leakage from the light guide. For example, a second reflector may be provided at the side opposite the light-entrance side. The second reflector may include or consist essentially of a material having a high index of refraction, such as a metal, that will reflect substantially all light impinging thereon back into the light guide. Alternately or in combination, the shape of the opposite end may be tailored to redirect the light to the interior and towards the back reflector, which then redirects the light out of the light guide.

In addition, embodiments of the invention feature one or more of: 1) power conditioning electronics to transform the line voltage to the constant current for driving the LED(s), 2) a heat sink to remove and dissipate the heat from the LED(s), 3) a temperature measurement and control circuit, and 4) an optical element to transform the LED light so that it more closely resembles that from a fluorescent light. Fluorescent lights are available in a variety of shapes that include linear, U-shaped, round, and other more complex shapes. Embodiments of the invention enable LED lights to adapt to similar configurations.

In one aspect, embodiments of the invention feature an illumination module including or consisting essentially of an illumination module and a light guide. The illumination module includes or consists essentially of at least one LED having a lens. The light guide has an inlet region for receiving light from the LED(s), a collimation region for collimating the received light, and an emission region for emitting the collimated light to the ambient. The shape of the inlet region is nonplanar and substantially complementary to the shape of the LED lens, such that substantially all light emitted through the LED lens strikes the inlet region at an angle perpendicular to the surface of the inlet region.

Embodiments of the invention may include one or more of the following, in any of a variety of combinations. The light guide may be configured to mate with the illumination module so as to define a gap between the surface of the inlet region and the LED lens. The shape of the inlet region may be parabolic or hemispherical. The shape of the collimation region may be parabolic. The axis of the parabola may be inclined with respect to the long axis of the light guide, thereby increasing the amount of the collimated light propagating from the collimation region that strikes a first surface in the emission region without intervening reflection, the first surface being at least one of reflective or light-scattering. Substantially all of the collimated light may strike the first surface without intervening reflection. The at least one LED may include or consist essentially of a single lens and a plurality of LED dies emitting light therethrough, and the parabolic shape of the collimation region may include or consist essentially of one parabolic section for each of the plurality of LED dies.

In order to facilitate emission of the collimated light, the emission region may include a plurality of surface discontinuities and/or a plurality of scattering agents. The density of the surface discontinuities and/or the scattering agents may increase as a function of distance away from the LED(s). The emission region may include a plurality of surface discontinuities opposite an emission surface from which the light is emitted. At least one of the surface discontinuities (or even each of them) may have the shape of a hemisphere, a paraboloid, or an elongated groove. The plurality of surface discontinuities may be disposed along a portion of the perimeter of the emission region to thereby define a width of an extent of the light emitted from the emission region. The cross-sectional shape of the emission region may be substantially parabolic, thereby directing the emitted light toward an emission surface substantially perpendicular to an axis of the parabola. The cross-sectional shape of the emission region may be substantially trapezoidal, and the emitted light may be emitted through a first parallel side of the trapezoidal shape longer than the second parallel side.

The light emitted from the emission region may substantially replicate the emission patter of a fluorescent light bulb having dimensions approximately equal to those of the illumination device. The illumination module may be configured to be modularly attachable to a plurality of light guides, each light guide having a different size and/or shape from the others. The illumination module may include a heat sink for conducting heat from the LED(s) and/or driver circuitry for supplying electrical current to the LED(s). The illumination module may be disposed at a first end of the light guide, and a second illumination module may be disposed at a second end of the light guide opposite the first end. The second illumination module may include one or more LEDs.

In another aspect, embodiments of the invention feature a method of illumination. Light is emitted through a lens of an LED, and substantially all of the light is coupled into a light guide through an inlet region. The inlet region has a nonplanar shape complementary to the shape of the LED lens, such that substantially all light emitted through the LED lens strikes the inlet region at an angle perpendicular to the surface of the inlet region. At least a portion of the coupled light is collimated, and at least a portion of the collimated light is emitted through the light guide into the ambient.

These and other objects, along with advantages and features of the invention, will become more apparent through reference to the following description, the accompanying drawings, and the claims. Furthermore, it is to be understood that the features of the various embodiments described herein are not mutually exclusive and can exist in various combinations and permutations. As used herein, the term "substantially" means±10%, and, in some embodiments, ±5%. The term "consists essentially of" means excluding other materials that contribute to function, unless otherwise defined herein. Nonetheless, such other materials may be present, collectively or individually, in trace amounts.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1:
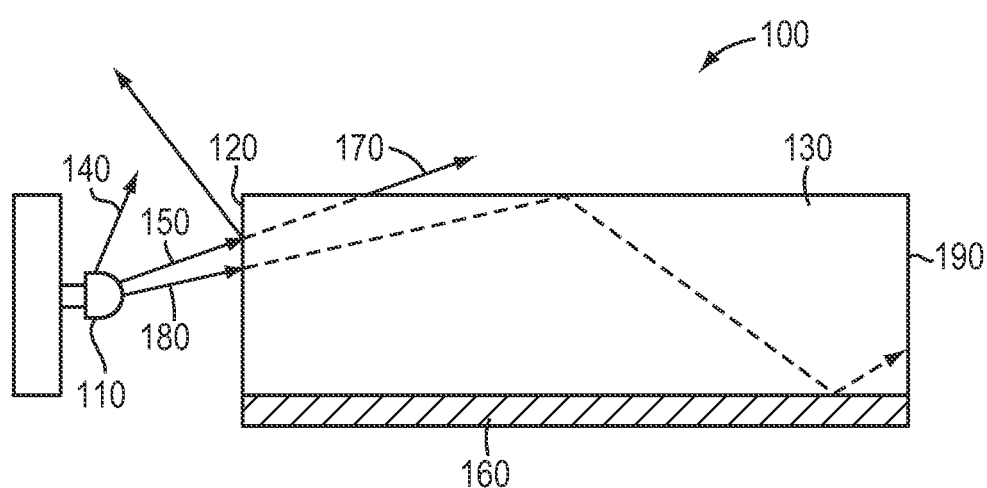
FIG. 1 is a schematic cross-section of an LED-based illumination device accordance with the prior art.
Figure 2A:
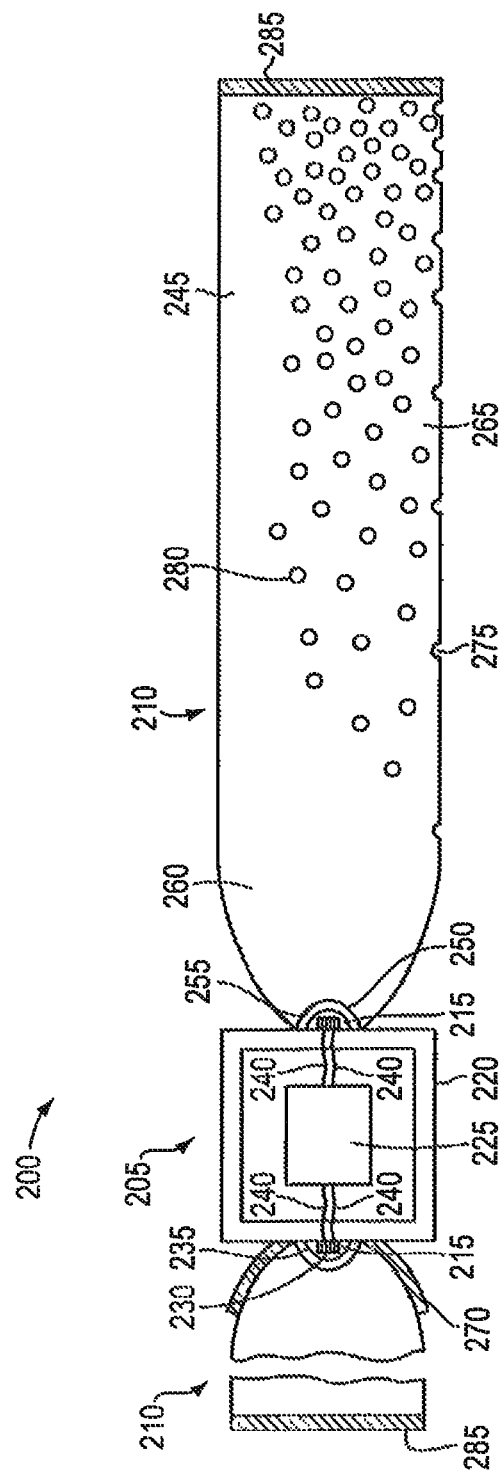
FIG. 2A is a schematic cross-section of an LED-based linear illumination device in accordance with various embodiments of the invention.

FIG. 2A depicts an illumination device 200 in accordance with various embodiments of the present invention. As shown, illumination device 200 includes or consists essentially of an illumination module 205 and an optics module 210. In general, the illumination module 205 includes or consists essentially of one or more LEDs 215 (and/or other discrete light sources), a support member 220 (that may also function as a heat sink, as described below), and driver circuitry 225 electrically connected to the LED 215. Each LED 215 preferably includes one or more LED dies 230 (each a semiconductor die featuring a light-emitting junction) and an LED lens 235 that at least partially surrounds and preferably encapsulates the LED die 230. The LED lens 235 is generally part of the "package" supporting and protecting the LED die 230 and has a shape that directs the light therefrom in a desired pattern and/or direction. For example, the LED lens 235 may be hemispherical or parabolic. As shown, each LED 215 is also electrically connected to the driver circuitry 225 by, e.g., one or more wires 240 and/or other suitable electrical connectors. One or more LEDs 215 may be disposed on a single surface of support member 220 and/or one or more LEDs 215 may be disposed on each of multiple surfaces of support member 220 (as shown in FIG. 2A).

The support member 220 may include or consist essentially of any suitable rigid material and may be electrically insulated from each LED 215. Preferably, the support member 220 is thermally connected to one or more LEDs 215 (i.e., in the manner of a heat sink) and conducts heat away from the LEDs 215 during their operation. For example, the support member 220 may include fins or other projections that increase its surface area in order to facilitate heat conduction away from an LED 215. Support member 220 may therefore include or consist essentially of a thermally conductive material, e.g., a metal or metal alloy, and/or may even feature an active cooling system such as a fan.

The driver circuitry 225 converts an input power signal (from, e.g., a DC source such as a battery or an AC source such as an AC main) into a form suitable for driving the LED 215. Driver circuitry 225 may also include dimmers, transformers, rectifiers, or ballasts suitable for operation with the LED 215, as understood by those of skill in the art. The driver circuitry 225 may be disposed on a support, for example on a printed circuit board. The driver circuitry 225 may also include circuitry and/or sensors to detect or determine the operating temperature of the LED 215 and control current and/or voltage supply thereto (based at least on the operating temperature), e.g., as disclosed in U.S. Patent Application Publication Nos. 2010/0320499, 2010/0176746, and 2011/0121760, the entire disclosure of each of which is incorporated by reference herein.

The illumination module 205 is preferably modular. That is, it is preferably designed to be utilized with various different optics modules 210, depending upon the desired shape of the illumination device 200 and/or the pattern or intensity of the light desired to be emitted therefrom. For example, the illumination module 205 may incorporate a standard socket into which multiple different optics modules 210 may be connected. Thus, a single illumination module 205 may be used in multiple different applications and/or replaced without replacing other components of a particular illumination device 200. As also described below, the illumination module 205 and the optics module 210 preferably collectively define a volume envelope that is substantially the same as that of a fluorescent bulb they are intended to replace. In such cases, the illumination device 200 may be utilized in existing fixtures or luminaires that are sized and shaped to receive particular fluorescent bulbs.

The optics module 210 generally includes a light guide 245 for receiving light from the LED 215 and emitting it in a desired pattern. As mentioned previously, that desired pattern is preferably the pattern of a fluorescent light bulb to be replaced by illumination device 200. The light guide 245 is preferably a solid TIR optic (including or consisting essentially of, e.g., plastic or glass), and may be fabricated by, e.g., injection molding. As shown, the light guide 245 is reversibly or permanently attached to the illumination module 205 such that light emitted by the LED 215 is efficiently coupled into the light guide 245. In order to enhance the efficiency of this in-coupling (by e.g., reducing or even substantially eliminating reflections at the inlet 250 that may result in light not being in-coupled into light guide 245), an inlet 250 of the light guide 245 preferably has a shape complementary to that of the LED lens 235. Specifically, the shape of the inlet 250 preferably "mirrors" that of LED lens 235 such that the light emitted by the LED 215 strikes the inlet 250, across substantially its entire surface, substantially perpendicular to the surface of inlet 250; and in general, the shapes of the inlet 250 and the lens 235 will be nonplanar. Thus, the surface of inlet 250 may have, e.g., a substantially hemispherical or parabolic shape. As shown in FIG. 2A, there may be a gap 255 defined between the LED lens 235 and the inlet 250, and this gap may be substantially empty (e.g., filled with air) or at least partially filled with an encapsulation material (preferably one having an index of refraction substantially equal to that of the light guide 245). In other embodiments the inlet 250 and the LED lens 235 are in contact and the gap 255 is absent. A substantially unfilled gap 255 may contribute to the modularity of the illumination device 200, as it may facilitate the attachment, removal, and replacement of the optics module 210 from the illumination module 205. In embodiments in which multiple LEDs 215 are emitting light into the light guide 245, there may be a single inlet 250 for each LED 215 and in-coupling its light into the light guide 245.

Figure 2B:
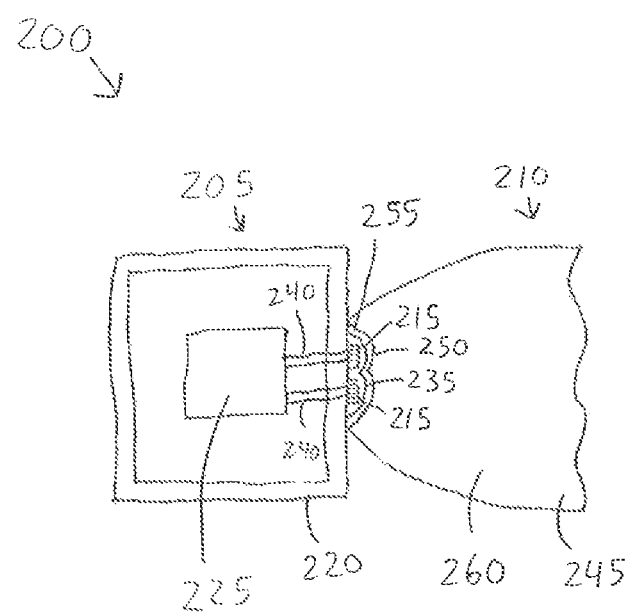
FIG. 2B is a schematic cross-section of a portion of an LED-based linear illumination device in accordance with various embodiments of the invention.

Once in-coupled into the light guide 245 via the inlet 250, the light from the LED 215 enters a collimation region 260 that collimates (by, e.g., internal reflection) the light and increases the uniformity of the light entering an emission region 265 of the light guide 245 (from which the light is emitted to the ambient in a desired pattern, as mentioned above). As shown in FIG. 2A, the collimation region 260 is preferably tapered between the inlet 250 and the emission region 265, and preferably the interface between the collimation region 260 and the emission region 265 is substantially seamless and smooth. In a preferred embodiment, the collimation region 260 has the shape of one or more parabolic sections, a shape which may collimate the in-coupled light from the LED 215 better than other shapes. For example, the collimation region 260 may take the shape of multiple superimposed parabolic sections, one for each LED 215 emitting light into the light guide 245 through the inlet(s) 250 and/or one for each LED die 230 disposed within the LED 215 emitting light into the light guide 245 through an inlet 250, as shown in FIG. 2B.

Preferably, the shape of the collimation region 260 (e.g., in cooperation with the shape of the inlet 250) is such that the angle of incidence of the light in-coupled at the inlet 250 strikes the outside edge of the collimation region 260 at an angle greater than the critical angle of light transmission from the collimation region 260 to the outside ambient; thus, the light is confined within the collimation region 260 by TIR. (This critical angle may be straightforwardly determined by those of skill in the art without undue experimentation utilizing, e.g., Snell's Law and the indices of refraction of the collimation region 260 and the outside ambient.) However, some embodiments of the invention utilize an additional reflector 270 disposed along at least a portion of the collimation region 260 in order to confine the light therein. The reflector 270 typically has an index of refraction larger than that of the collimation region 260 and may include or consist essentially of, e.g., a metal or other substantially specular reflective material. Thus, via the shape of collimation region 260 and/or the addition of reflector 270 (which may be disposed outside or inside the collimation region 260), preferably substantially no light is emitted to the outside ambient through the collimation region; rather, the light is collimated therein and propagates into the emission region 265 for emission.

The emission region 265 receives the collimated light from the collimation region 260 and emits it to the outside ambient via, e.g., scattering. Thus, the emission region 265 of light guide 245 preferably incorporates one or more optical elements that scatter the light, enabling its emission from light guide 245 in a desired pattern and/or intensity. As shown in FIG. 2A, these optical elements may include or consist of, e.g., one or more discontinuities 275 in the surface of emission region 265 (e.g., on the surface opposite the desired emission direction) and/or one or more scattering agents 280 embedded within the volume of emission region 265. The discontinuities 275 may be concave depressions in the surface of emission region 265 shaped like, e.g., hemispheres, facets, pyramids, or elongated grooves, and distributed along a portion of the circumference of emission region 265 (e.g., the portion of the circumference from which light emission is not desired). In order to enhance scattering therefrom, one or more of the discontinuities 275 may be partially or substantially filled with a scattering material or coating, e.g., titanium dioxide powder and/or white paint. (The scattering material or coating may even be disposed on the surface of emission region 265 between the discontinuities 275.) The scattering agents 280 may be particles, e.g., spheres or other suitable shapes, having an index of refraction different from that of emission region 265, and may be "inserted" within the emission region 265 during the formation thereof (by, e.g., injection molding, in which case the agents 280 may be dispersed colloidally in the fluid material prior to its injection). In a preferred embodiment, the scattering agents 280 have an index of refraction lower than that of the emission region 265 (e.g., are hollow), and are substantially spherical with sizes ranging from approximately 0.1 µm to approximately 0.1 mm. In embodiments of the invention featuring scattering agents 280 and lacking discontinuities 275, a reflector may be disposed along at least a portion of the surface of emission region 265 from which light emission is not desired. As shown in FIG. 2A, the density of the discontinuities 275 and/or the scattering agents 280 may increase as a function of distance away from the LED 215; thus, as the amount of light within the emission region 265 decreases due to distance from the LED 215, increasingly more of the light is scattered and emitted from the emission region 265.

Figure 3A:
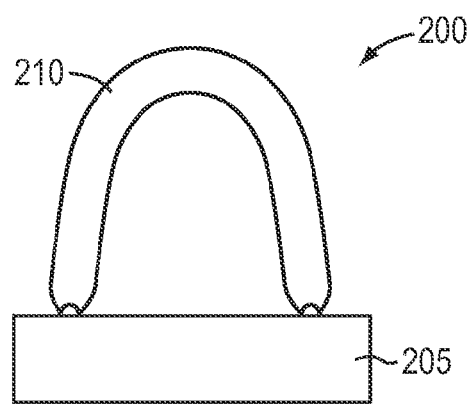
FIGS. 3A-3E are schematic plan views of exemplary configurations of illumination devices in accordance with various embodiments of the invention.
Figure 3B:
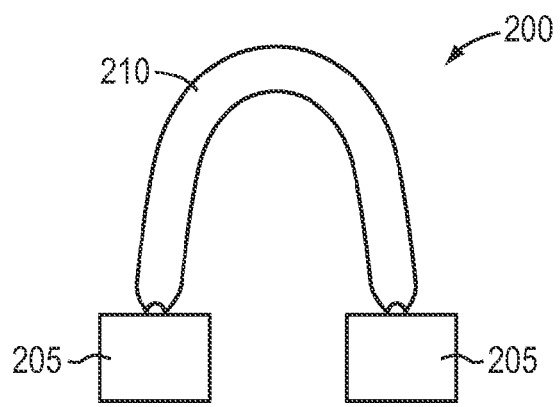
Figure 3C:
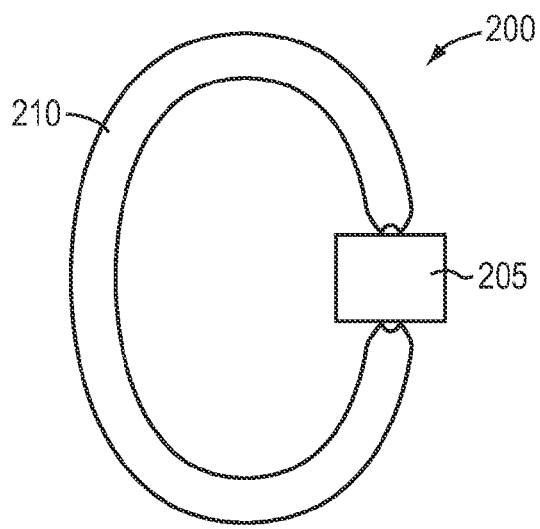
Figure 3D:
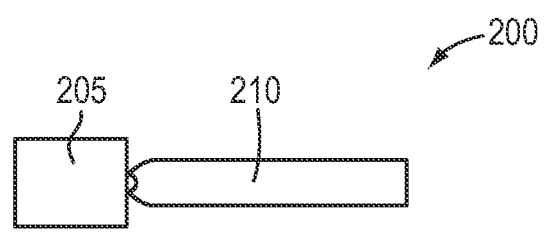
Figure 3E:
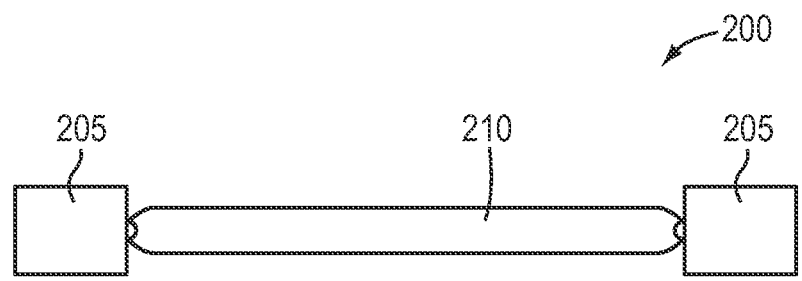

As shown in FIG. 2A, a reflector 285 may be disposed at the end of emission region 265 furthest away from the LED 215 in order to facilitate containment of light within the light guide 245 until it is desirably emitted from the emission region 265. Of course, other shapes of the light guide 245 and/or arrangements of the illumination module 205 and optics module 210 are possible in accordance with embodiments of the present invention. FIGS. 3A-3E depict some exemplary illumination devices 200 having a variety of shapes and arrangements (most details of the various illumination devices 200 depicted in FIG. 2A are omitted from FIGS. 3A-3E for clarity). For example, FIG. 3A depicts a U-shaped optics module 210 having both ends attached to a single illumination module 205, which thus includes at least one LED 215 disposed at each end of the optics module 210. These LEDs 215 may share common driver circuitry or may each have dedicated driver circuitry. FIG. 3B depicts a similar U-shaped optics module 210 having each end attached to a different discrete illumination module 205. FIG. 3C depicts a circular or oval-shaped optics module 210 having both ends attached to a single illumination module 205. (In various embodiments, illumination devices 200 similar to that depicted in FIG. 3C may include discrete illumination modules 205 at each end of the shaped optics module 210.) In embodiments such as those depicted in FIGS. 3A-3C, the emission region 265 of the illumination module 210 may incorporate any of the optical elements described above (e.g., discontinuities 275 and/or scattering agents 280), and these optical elements may change (e.g., increase) in density as a function from either end of the optics module 210. FIGS. 3D and 3E depict additional exemplary illumination devices 200 featuring straight tubular optics modules 210 and illumination modules disposed either at one end (FIG. 3D) or both ends (FIG. 3E).

Figure 4A:
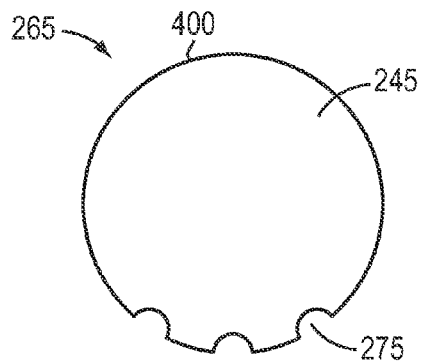
FIGS. 4A-4E are schematic cross-sections of light guides utilized in illumination devices in accordance with various embodiments of the invention.
Figure 4B:
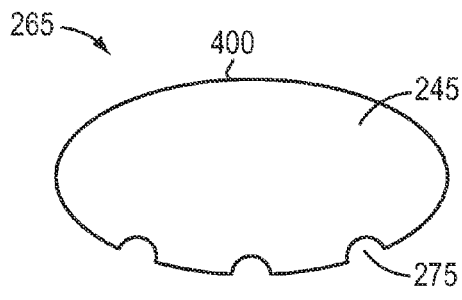
Figure 4C:
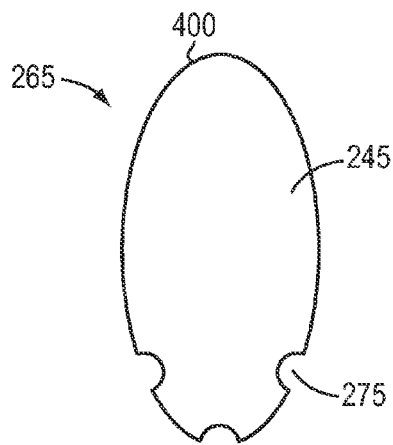
Figure 4E:
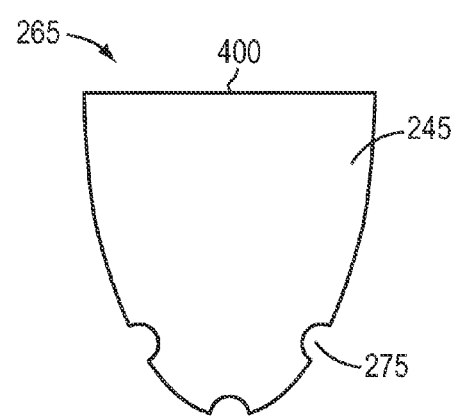
Figure 4D:
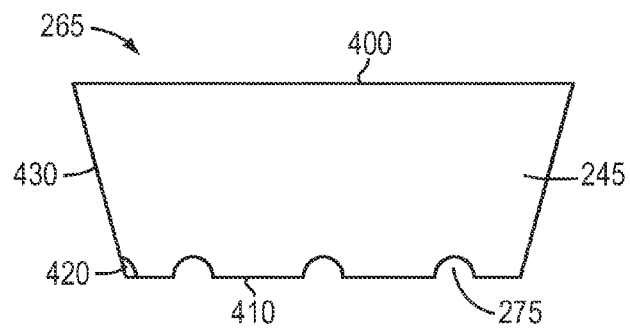

FIGS. 4A-4E schematically depict a variety of cross-sectional shapes of the light guide 245 that may be utilized in accordance with embodiments of the present invention, depending upon the desired shape for the emitted light beam. FIGS. 4A-4C depict circular and oval-shaped cross-sections having an emission surface 400 from which the light is emitted from the emission region 265. As shown, the illumination device 200 may incorporate discontinuities 275 arranged along at least a portion of the circumference of the emission region 265 opposite the emission surface 400. In various embodiments, the width and/or focus of the light emitted from the emission region 265 is determined at least in part by the extent of the circumference of emission region 265 covered by the discontinuities 275. For example, fewer discontinuities 275 spread over only a small portion of the circumference of emission region 265 opposite emission surface 400 may result in a wider, more diffuse emitted beam. Similarly, discontinuities 275 spread over a larger portion of the circumference of emission region 265 may result in a thinner, more concentrated emitted beam. FIG. 4D depicts an emission region 265 having a trapezoidal cross-section, in which the smaller parallel side 410 of the trapezoid features discontinuities 275 and the larger parallel side contains the emission surface 400. The angle 420 between side 410 and a side 430 may be selected to at least partially determine the angle of distribution of the light emitted through the emission surface 400. For example, an angle 420 of approximately 135° will define a wider emitted beam than an angle 420 of less than 135° (e.g., approximately 90°). FIG. 4E depicts an emission region 265 having a parabolic cross-section in which the emission surface 400 is substantially perpendicular to the axis of the parabola. In such embodiments, the emission surface 400 may be substantially planar or curved, depending upon the desired pattern of output light. Of course, each of the emission regions 265 may include scattering agents 280 instead of or in addition to the discontinuities 275.

Figure 5:
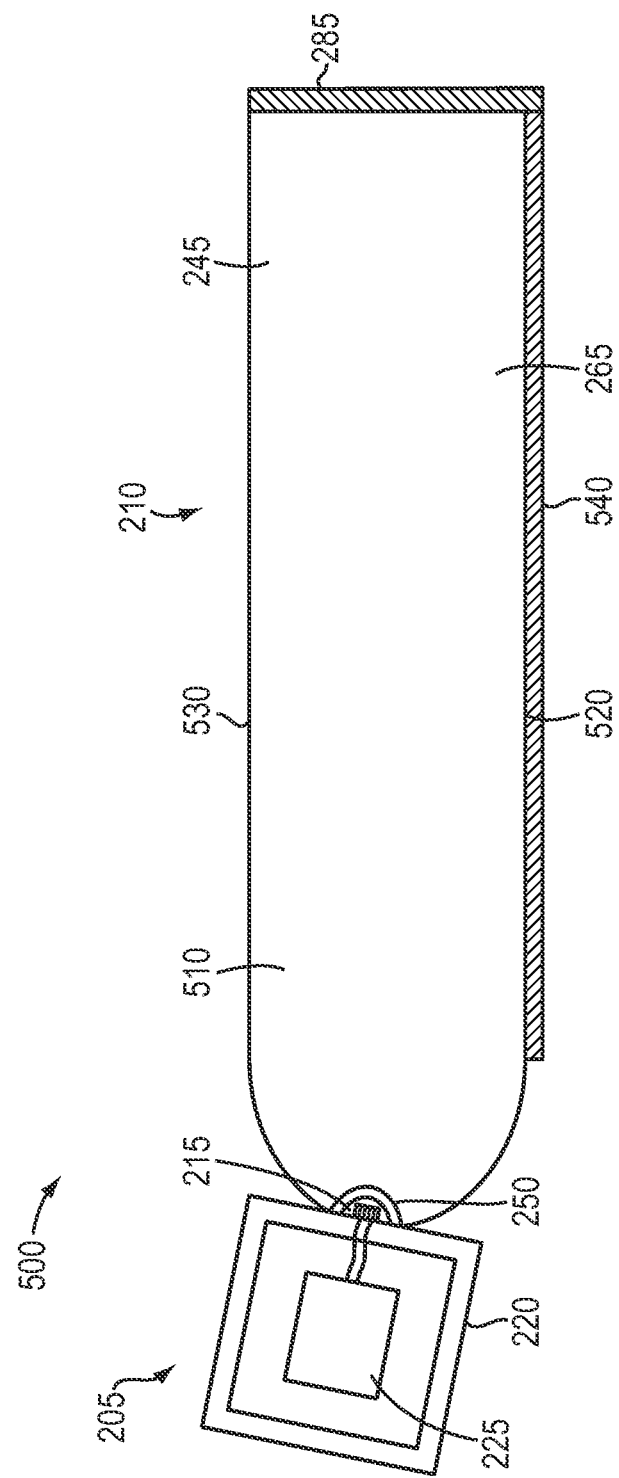
FIG. 5 is a schematic cross-section of an LED-based linear illumination device in accordance with various embodiments of the invention.

Illumination devices in accordance with embodiments of the present invention may also be configured to minimize the number of reflections the in-coupled light undergoes before entering the emission region 265, as each such reflection has the potential to reduce overall efficiency (due to, e.g., absorption or partial reflection in an unintended direction due to microscopic nonuniformities in the light guide 245). FIG. 5 schematically depicts an illumination device 500 having a collimation region 510 angled to distribute the light in-coupled at inlet 250 across a surface 520 of light guide 245 (opposite an emission surface 530 through which the light is emitted into the outside ambient) in a highly uniform manner while minimizing the number of internal reflections. As shown, the collimation region 510 may be shaped similarly to the collimation region 260 previously described, e.g., as one or more parabolic sections, but may be arranged to collimate the light at a non-zero angle to surface 520. That is, the axis of the parabola(s) may be inclined relative to the surface 520 to maximize the amount of light striking surface 520 without further reflection after leaving collimation region 510. Thus, illumination module 205, and the inlet 250 may also be arranged at a non-zero angle to surface 520, as shown. The emission region 265 of the light guide 245 may incorporate a reflector 540 on surface 520 thereof (as shown in FIG. 5), and/or may incorporate discontinuities 275 and/or scattering agents 280 as previously described. The reflector 540 may include or consist essentially of a Lambertian scattering material that distributes the light over a wide exit angle, thereby enhancing uniformity of the emitted light.

The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. An illumination device comprising:
    an illumination module comprising at least one light-emitting diode (LED) having a lens;
    disposed in contact with the illumination module, a light guide having (i) an inlet region for receiving light from the at least one LED, (ii) a collimation region for collimating the received light, and (iii) an emission region for emitting the collimated light to an ambient, the emission region having first and second opposed surfaces through at least one of which light is emitted,
    wherein (i) a shape of the inlet region is nonplanar and substantially complementary to a shape of the LED lens, such that substantially all light emitted through the LED lens strikes the inlet region at an angle perpendicular to a surface of the inlet region, and (ii) a shape of the collimation region is parabolic with an axis bisecting the parabola non-parallel with respect to both the first and second surfaces of the emission region, thereby increasing an amount of the collimated light propagating from the collimation region that strikes the first or second surface of the emission region without intervening reflection.

2. The illumination device of claim 1, wherein the light guide is configured to mate with the illumination module so as to define a gap between the surface of the inlet region and the LED lens.

3. The illumination device of claim 1, wherein the shape of the inlet region is parabolic.

4. The illumination device of claim 1, wherein the shape of the inlet region is hemispherical.

5. An illumination device comprising:
    an illumination module comprising at least one light-emitting diode (LED) having a lens;
    disposed in contact with the illumination module, a light guide having (i) an inlet region for receiving light from the at least one LED, (ii) a collimation region for collimating the received light, and (iii) an emission region for emitting the collimated light to an ambient,
    wherein (i) the at least one LED comprises a single lens and a plurality of LED dies emitting light therethrough, (ii) a shape of the collimation region comprises a superposition of one parabolic section for each of the plurality of LED dies, and (iii) a shape of the inlet region is nonplanar and substantially complementary to a shape of the LED lens, such that substantially all light emitted through the LED lens strikes the inlet region at an angle perpendicular to a surface of the inlet region.

6. The illumination device of claim 1, wherein the emission region comprises, to facilitate emission of the collimated light, at least one of a plurality of surface discontinuities or a plurality of scattering agents.

7. The illumination device of claim 6, wherein a density of the at least one of a plurality of surface discontinuities or a plurality of scattering agents increases as a function of distance away from the at least one LED.

8. The illumination device of claim 6, wherein the emission region comprises a plurality of surface discontinuities opposite an emission surface from which the light is emitted, at least one of the surface discontinuities having a shape of a hemisphere, a paraboloid, or an elongated groove.

9. The illumination device of claim 8, wherein the plurality of surface discontinuities is disposed along a portion of a perimeter of the emission region to thereby define a width of an extent of the light emitted from the emission region.

10. The illumination device of claim 1, wherein a cross-sectional shape of the emission region is substantially parabolic, thereby directing the emitted light toward an emission surface substantially perpendicular to an axis of the parabola.

11. The illumination device of claim 1, wherein a cross-sectional shape of the emission region is substantially trapezoidal, and the emitted light is emitted through a first parallel side of the trapezoidal shape longer than a second parallel side of the trapezoidal shape.

12. The illumination device of claim 1, wherein the light emitted from the emission region substantially replicates an emission pattern of a fluorescent light bulb having dimensions approximately equal to those of the illumination device.

13. The illumination device of claim 1, wherein the illumination module is configured to be modularly attachable to a plurality of light guides, each light guide having at least one of a different size or shape from the others.

14. The illumination device of claim 1, wherein the illumination module comprises at least one of a heat sink for conducting heat from the at least one LED or driver circuitry for supplying electrical current to the at least one LED.

15. The illumination device of claim 1, wherein the illumination module is disposed at a first end of the light guide, and further comprising a second illumination module disposed at a second end of the light guide opposite the first end, the second illumination module comprising at least one LED.

16. The illumination device of claim 5, wherein the light guide is configured to mate with the illumination module so as to define a gap between the surface of the inlet region and the LED lens.

17. The illumination device of claim 5, wherein the shape of the inlet region is parabolic.

18. The illumination device of claim 5, wherein the shape of the inlet region is hemispherical.

19. The illumination device of claim 5, wherein the emission region comprises, to facilitate emission of the collimated light, at least one of a plurality of surface discontinuities or a plurality of scattering agents.

20. The illumination device of claim 19, wherein a density of the at least one of a plurality of surface discontinuities or a plurality of scattering agents increases as a function of distance away from the at least one LED.

21. The illumination device of claim 19, wherein the emission region comprises a plurality of surface discontinuities opposite an emission surface from which the light is emitted, at least one of the surface discontinuities having a shape of a hemisphere, a paraboloid, or an elongated groove.

22. The illumination device of claim 21, wherein the plurality of surface discontinuities is disposed along a portion of a perimeter of the emission region to thereby define a width of an extent of the light emitted from the emission region.

23. The illumination device of claim 5, wherein a cross-sectional shape of the emission region is substantially parabolic, thereby directing the emitted light toward an emission surface substantially perpendicular to an axis of the parabola.

24. The illumination device of claim 5, wherein a cross-sectional shape of the emission region is substantially trapezoidal, and the emitted light is emitted through a first parallel side of the trapezoidal shape longer than a second parallel side of the trapezoidal shape.

25. The illumination device of claim 5, wherein the light emitted from the emission region substantially replicates an emission pattern of a fluorescent light bulb having dimensions approximately equal to those of the illumination device.

26. The illumination device of claim 5, wherein the illumination module is configured to be modularly attachable to a plurality of light guides, each light guide having at least one of a different size or shape from the others.

27. The illumination device of claim 5, wherein the illumination module comprises at least one of a heat sink for conducting heat from the at least one LED or driver circuitry for supplying electrical current to the at least one LED.

28. The illumination device of claim 5, wherein the illumination module is disposed at a first end of the light guide, and further comprising a second illumination module disposed at a second end of the light guide opposite the first end, the second illumination module comprising at least one LED.

29. The illumination device of claim 5, wherein a shape of the collimation region is parabolic.

30. The illumination device of claim 29, wherein an axis of the parabola is inclined with respect to a long axis of the light guide, thereby increasing an amount of the collimated light propagating from the collimation region that strikes a first surface in the emission region without intervening reflection, the first surface being at least one of reflective or light-scattering.

31. The illumination device of claim 1, wherein light is emitted from the first surface and the second surface is at least one of reflective or light-scattering.

32. The illumination device of claim 1, wherein the first and second surfaces are substantially parallel along an entire length of the emission region.

* * * * *